(12) United States Patent
Eckelmann-Wendt et al.

(10) Patent No.: US 11,161,533 B2
(45) Date of Patent: Nov. 2, 2021

(54) SYSTEM, IN PARTICULAR FOR CONTROLLING SIGNAL TOWERS IN RAIL TRAFFIC

(71) Applicant: SIEMENS MOBILITY GMBH, Munich (DE)

(72) Inventors: Uwe Eckelmann-Wendt, Wolfenbuettel (DE); Stefan Gerken, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 545 days.

(21) Appl. No.: 16/088,859

(22) PCT Filed: Mar. 2, 2017

(86) PCT No.: PCT/EP2017/054863
§ 371 (c)(1),
(2) Date: Sep. 27, 2018

(87) PCT Pub. No.: WO2017/167537
PCT Pub. Date: Oct. 5, 2017

(65) Prior Publication Data
US 2019/0106134 A1    Apr. 11, 2019

(30) Foreign Application Priority Data

Mar. 29, 2016    (DE) .................... 10 2016 205 119.9

(51) Int. Cl.
*B61L 7/00*        (2006.01)
*G06F 11/16*       (2006.01)
(Continued)

(52) U.S. Cl.
CPC ................. *B61L 7/00* (2013.01); *B61L 19/06* (2013.01); *B61L 21/04* (2013.01);
(Continued)

(58) Field of Classification Search
CPC .. B61L 7/00; B61L 19/06; B61L 21/04; B61L 27/0038; B61L 2019/065; G06F 11/16; G06F 11/18
See application file for complete search history.

(56) References Cited

U.S. PATENT DOCUMENTS

2010/0327125 A1*  12/2010  Braband .............. B61L 21/10
                                                246/62
2012/0221889 A1*   8/2012  Beilin ................ G06F 11/1679
                                                714/12
(Continued)

FOREIGN PATENT DOCUMENTS

CN         1602455 A      3/2005
CN       101254790 A      9/2008
(Continued)

OTHER PUBLICATIONS

Huang, Tao et al.: "Safety Computer System Based on 2 out of 3 Redundant Structure", Computer Engineering vol. 37, No. 18, Sep. 2011—English abstract.

*Primary Examiner* — Jason C Smith
(74) *Attorney, Agent, or Firm* — Laurence A. Greenberg; Werner H. Stemer; Ralph E. Locher

(57) ABSTRACT

A system, in particular for controlling signal towers in rail traffic, includes at least a plurality of redundant replicants for generating redundant control signals. A voter structure having a plurality of majority voters is also provided. Each majority voter has a respective output and inputs that are connected to the outputs of the plurality of redundant replicants. The voter structure and the plurality of redundant replicants are separated from one another in terms of hardware, the outputs of the plurality of majority voters are connected to the inputs of a discriminator voter and the output of the discriminator voter provides a control signal, in particular for controlling signal towers. The discriminator
(Continued)

voter only emits a control signal when the inputs thereof are not at variance.

13 Claims, 2 Drawing Sheets

(51) Int. Cl.
*G06F 11/18* (2006.01)
*B61L 27/00* (2006.01)
*B61L 19/06* (2006.01)
*B61L 21/04* (2006.01)

(52) U.S. Cl.
CPC ......... *B61L 27/0038* (2013.01); *G06F 11/16* (2013.01); *G06F 11/18* (2013.01); *B61L 2019/065* (2013.01)

(56) References Cited

U.S. PATENT DOCUMENTS

| | | | |
|---|---|---|---|
| 2012/0325981 A1* | 12/2012 | Lostun | B61L 5/1881 246/219 |
| 2013/0076899 A1* | 3/2013 | Eckelmann-Wendt | G09G 3/006 348/143 |
| 2016/0232076 A1* | 8/2016 | Braband | B61L 27/00 |
| 2019/0106134 A1* | 4/2019 | Eckelmann-Wendt | B61L 19/06 |
| 2019/0114860 A1* | 4/2019 | Eckelmann-Wendt | G07C 13/00 |
| 2019/0132119 A1* | 5/2019 | Eckelmann-Wendt | H04L 9/3247 |
| 2019/0188093 A1* | 6/2019 | Eckelmann-Wendt | G06F 11/1641 |
| 2020/0290657 A1* | 9/2020 | Eckelmann-Wendt | H04L 12/18 |
| 2020/0310887 A1* | 10/2020 | Eckelmann-Wendt | G06F 9/5066 |

FOREIGN PATENT DOCUMENTS

| | | |
|---|---|---|
| CN | 104411564 A | 3/2015 |
| CN | 105279049 A | 1/2016 |
| DE | 102012211273 A1 | 1/2014 |
| DE | 102013218814 A1 | 3/2015 |
| EP | 0935198 A1 | 8/1999 |
| EP | 2691819 | 2/2014 |
| EP | 2884392 A1 | 6/2015 |
| WO | 2012130246 A1 | 10/2012 |

* cited by examiner

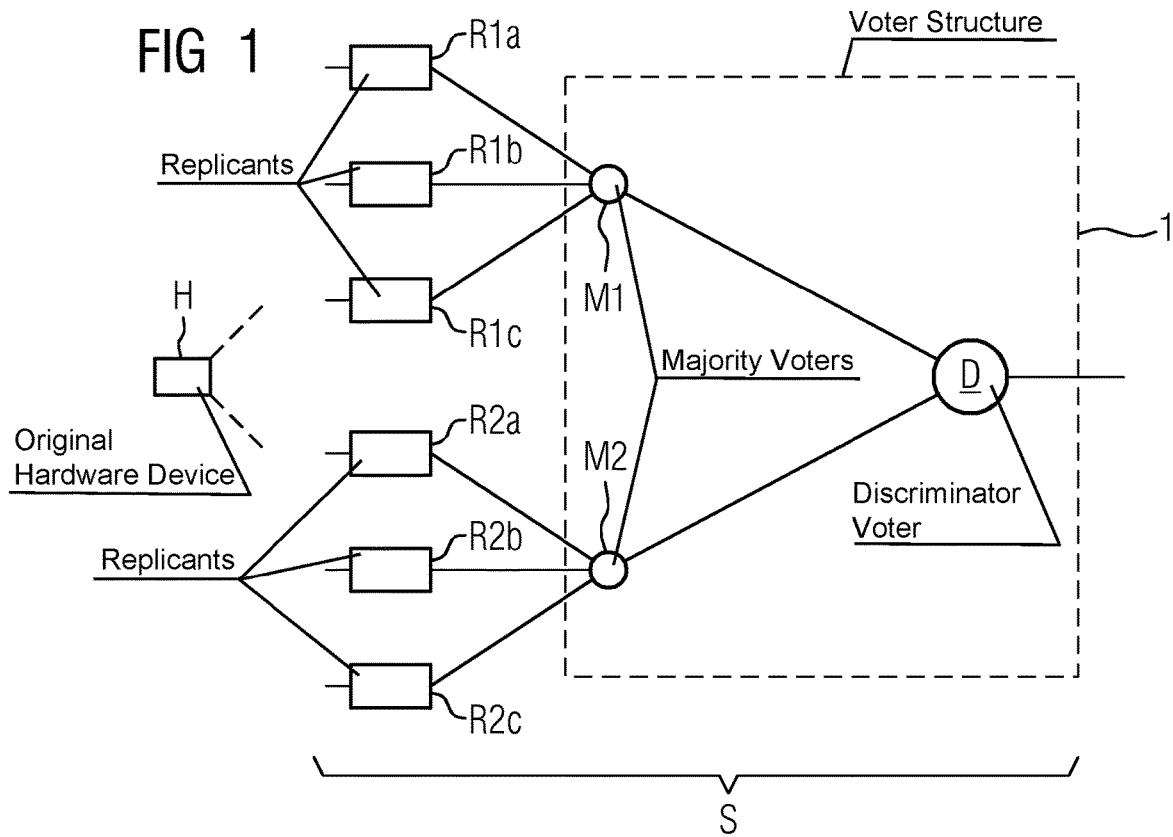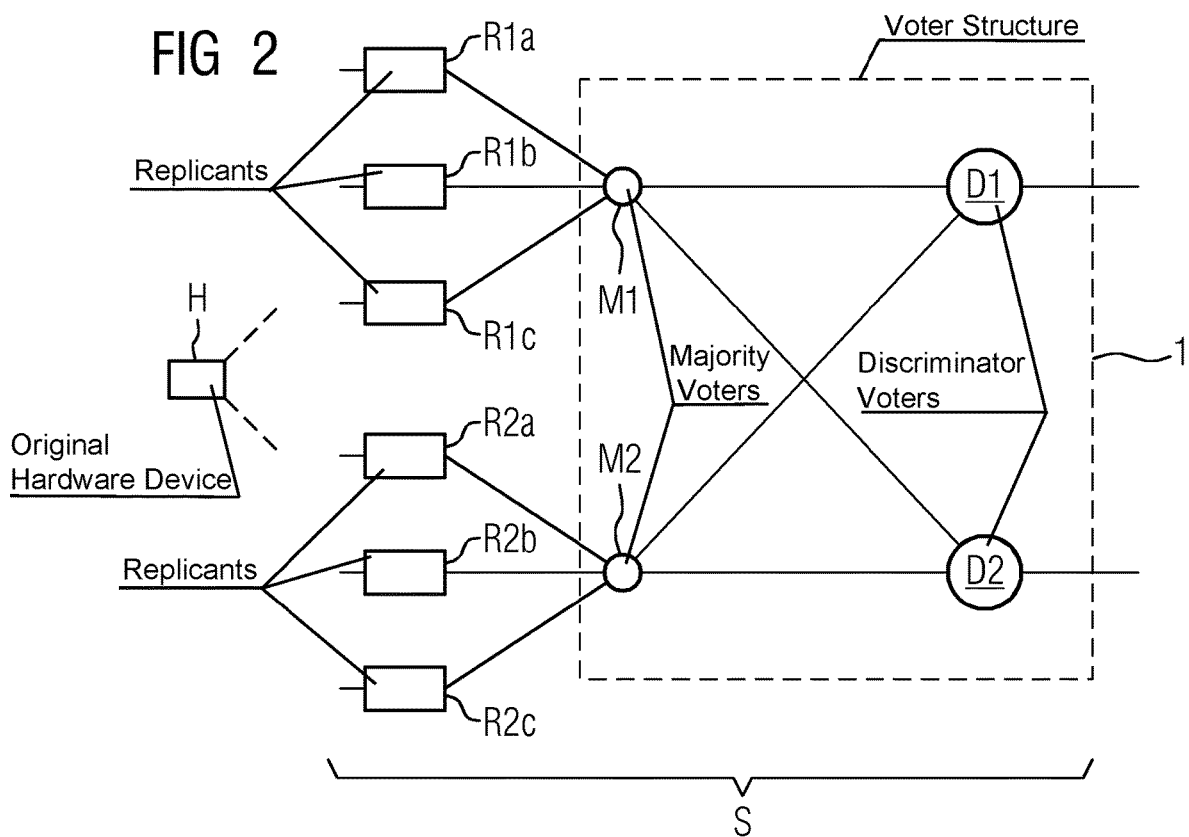

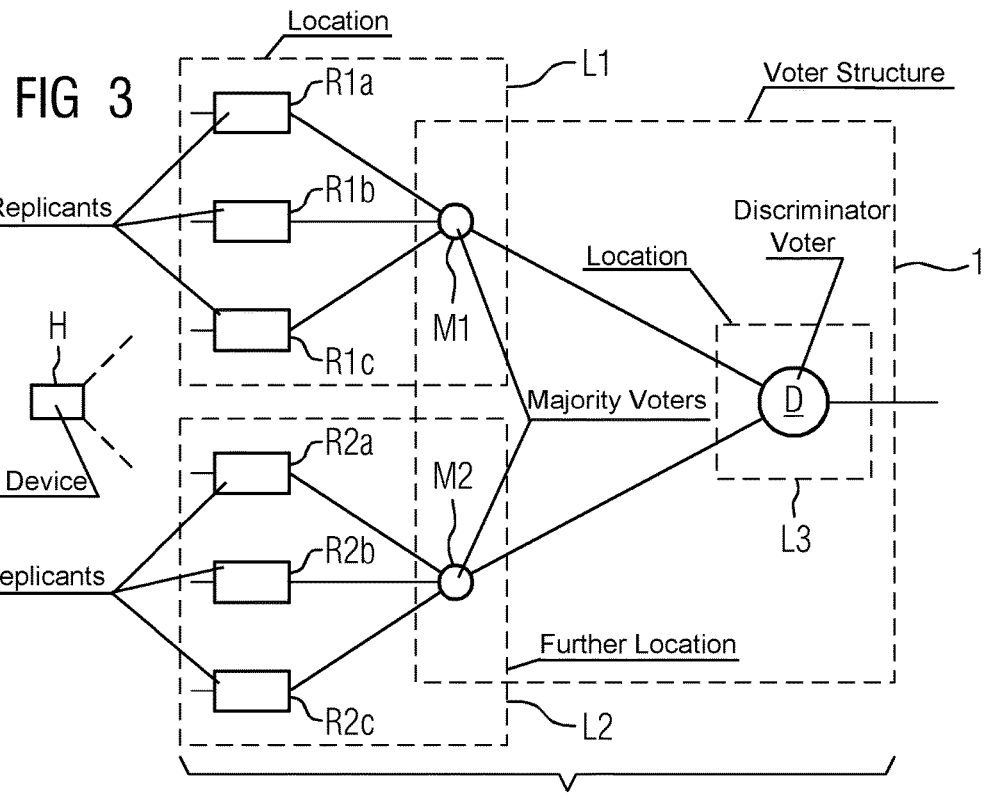
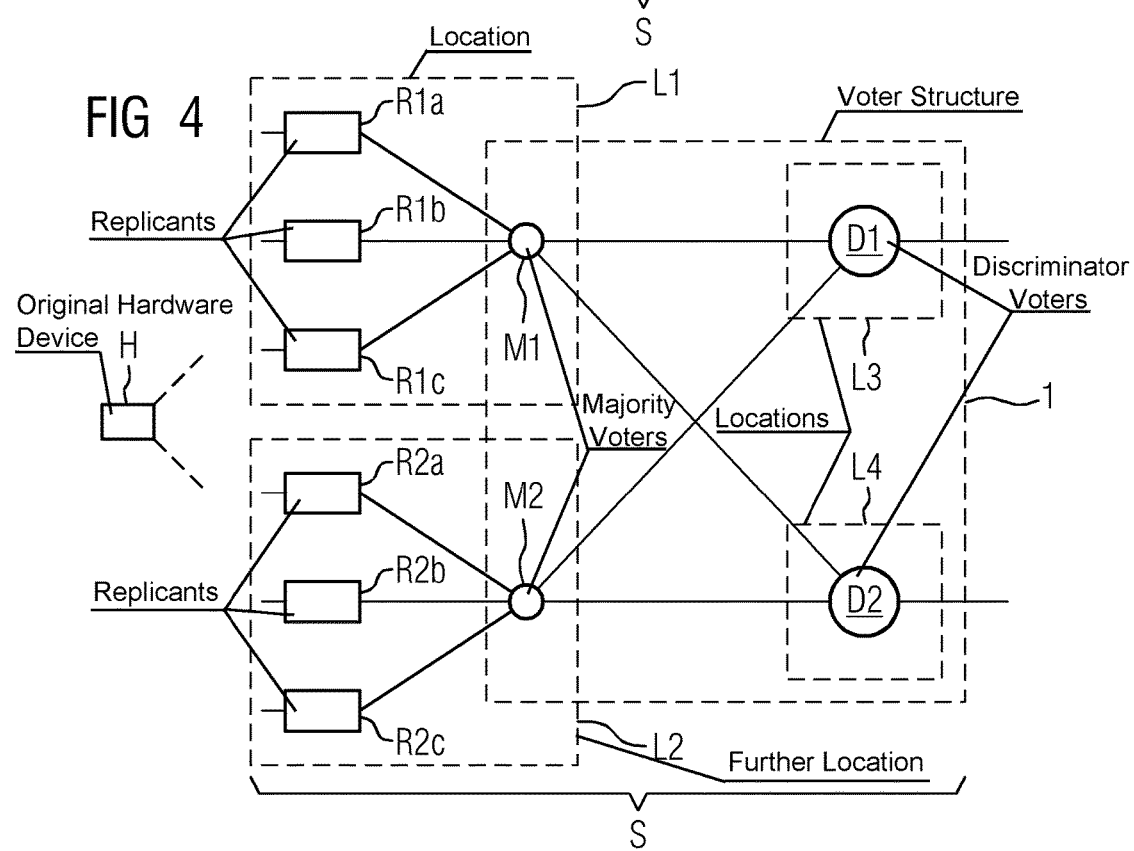

SYSTEM, IN PARTICULAR FOR CONTROLLING SIGNAL TOWERS IN RAIL TRAFFIC

BACKGROUND OF THE INVENTION

Field of the Invention

The invention relates to a system, in particular for controlling signal towers in rail traffic.

In rail traffic, the control signals for controlling signal towers must comply with certain safety requirements. These are typically distributed systems which in each case generate outputs or control signals. To increase safety, signal-generating hardware devices are replicated a number of times and known as "replicants". The outputs from these "replicants" are directed to central voters. Such a voter is a decision maker which generates the "correct" output data from a given number of items of redundant input data. Majority voters, which generate an output signal on the basis of a majority decision, are often used for this purpose. The output or "voted" signals are provided to the consumer. Such voted signals are trustworthy. In the case of central voters, however, the voter itself is a weak point because if this voter fails voted signals are also not forwarded to the consumers. Voters have hitherto been associated with the replicants in hardware terms and form a common failure unit with the latter. As a result, it is not apparent that there are voters since voting is considered to be a property of the equipment.

SUMMARY OF THE INVENTION

The object is that of providing an alternative system in particular for controlling signal towers which has a low failure risk together with high availability.

The invention provides a system, in particular for controlling signal towers in rail traffic, which has at least one plurality of redundant replicants for generating redundant control signals. A voter structure is additionally provided which comprises a plurality of majority voters, each majority voter having inputs that are connected to the outputs of the plurality of redundant replicants, and a respective output. According to the invention, the voter structure and the plurality of redundant replicants are separated from one another in hardware terms and the outputs of the plurality of majority voters are connected to the inputs of a discriminator voter, the output of the discriminator voter providing a control signal, in particular for controlling signal towers. The discriminator voter does not output a control signal if the inputs thereof are at variance.

The invention has the advantage that, as a result of the separation in hardware terms, the plurality of replicants and the voter structure are situated in distinguishable failure units, which simplifies locating malfunctions or failures. Furthermore, the tasks they perform are consequently separated from one another. In addition, this separation makes it possible to use conventional commercial computing hardware and there is no longer any need to make use of special hardware with integrated voter units. Furthermore, the discriminator voter can advantageously only output a control signal if the inputs thereof are not at variance with one another, whereby any nonconformity of an upstream majority voter can additionally be identified. Since, in the preliminary stage, the majority voters already send control signals which have been voted by a majority decision to the discriminator voter, an additional safety level is thus introduced which reduces the probability of erroneous signal transmission. A discriminator voter furthermore has less complex and thus more failure-resistant hardware than a majority voter, such that the probability of failure of the inventive system is reduced.

The discriminator voter preferably acts as a through-connector if only one input signal is applied. Failure of one or more majority voters can consequently be compensated, such that a voted control signal continues to be output at the discriminator voter output. System availability is increased as a consequence since failure of a majority voter does not then result in overall system failure.

An error message is preferably output in the event of the discriminator voter not receiving an input signal from a majority voter. Such monitoring means the majority voter in question can be appropriately identified and, as a result, checked or replaced.

A plurality of downstream discriminator voters can advantageously be used, the outputs of the plurality of majority voters being connected to each input of each discriminator voter and a control signal, in particular for controlling signal towers, being provided at each output of the respective discriminator voter. Redundancy with regard to the discriminator voters is achieved as a result. Should a discriminator voter fail, a control signal is still available at the output of the remaining discriminator voters. In addition, the respective control signals can be compared with one another. The system can thus tolerate failure or malfunction of a discriminator voter.

A plurality of replicants can be spatially separated from a plurality of replicants and/or the plurality of downstream majority voters and/or the plurality of discriminator voters can be spatially separated from one another. In practice, these are frequently spatially distributed systems. For example, a plurality of replicants can be situated at different locations which however generate the same control signal per location. The majority voters or the discriminator voters can also be separated from one another.

If one of these "locations" then fails, for example due to particular events such as supply failures, natural disasters etc., a voted control signal can nevertheless be provided at one or more different locations. Local redundancy is achieved as a result since failure of a location or a plurality of locations can be tolerated. Failure of a discriminator voter or associated connections furthermore has a reduced impact on the system since they are located on the failure unit of the receiver or consumer.

An error message can be output if not all the input signals at a majority voter are identical. As a result, error location can be achieved which can lead to checking or replacement of a replicant. Nonconforming inputs of a majority voter can furthermore reliably be blocked.

The entire system can be blocked if the discriminator voter does not receive an input signal from a majority voter or if the inputs of the discriminator voter are at variance with one another. A very high level of safety can be achieved as a result.

The downstream discriminator voter or the plurality of downstream discriminator voters can form a self-contained configurable device.

The downstream discriminator voter or the plurality of downstream discriminator voters is/are preferably integrated within an evaluation unit. As a result, the evaluation unit and discriminator voter are in the same failure unit.

BRIEF DESCRIPTION OF THE SEVERAL VIEWS OF THE DRAWING

The above-described characteristics, features and advantages of this invention and the manner in which these are achieved will become more clearly and distinctly comprehensible from the following description of the exemplary embodiments, which are explained in greater detail in connection with the drawings, in which:

FIG. 1 shows a system for controlling signal towers according to a first embodiment, FIG. 2 shows a system for controlling signal towers according to a second embodiment, FIG. 3 shows a system for controlling signal towers according to a third embodiment and FIG. 4 shows a system for controlling signal towers according to a fourth embodiment.

FIG. 1 shows a system S for controlling signal towers according to a first embodiment. An original hardware device H is here shown which is replicated a number of times, i.e. a plurality of replicants R1$a$, R1$b$, R1$c$, R2$a$, R2$b$, R2$c$ is generated to create redundancy, which in the absence of a fault generate the same control signal as the original hardware device H. The system S comprises the plurality of replicants R1$a$, R1$b$, R1$c$, R2$a$, R2$b$, R2$c$ and an associated voter structure 1. The plurality of replicants R1$a$, R1$b$, R1$c$, R2$a$, R2$b$, R2$c$ generate control signals which are voted on by means of the voter structure 1. Electrical circuits, logic circuits, processors, computers, control devices etc. can be considered as the hardware device H or replicants R1$a$, R1$b$, R1$c$, R2$a$, R2$b$, R2$c$, the invention not being limited to these examples. The signal for controlling signal towers can for example be used to change a railroad switch, to activate a derailer or for example to change a light from red to green, it being possible to consider many further convenient rail traffic control options.

In this embodiment, six replicants R1$a$, R1$b$, R1$c$, R2$a$, R2$b$, R2$c$ are provided by way of example, it being possible in principle to provide as many replicants R1$a$, R1$b$, R1$c$, R2$a$, R2$b$, R2$c$ as desired. The plurality of replicants R1$a$, R1$b$, R1$c$, R2$a$, R2$b$, R2$c$ are connected to a plurality of majority voters M1, M2, i.e. the outputs of the plurality of replicants R1$a$, R1$b$, R1$c$, R2$a$, R2$b$, R2$c$ are applied to the inputs of the plurality of majority voters M1, M2. In the present example, the outputs of replicants R1$a$, R1$b$, R1$c$ are applied purely by way of example to the inputs of M1 and the outputs of replicants R2$a$, R2$b$, R2$c$ to the inputs of M2.

The majority voters M1, M2 form a majority decision for their output signal on the basis of their incoming signals, i.e. if a majority of the inputs have the same signal, said signal is output. If, purely by way of example, a "high level" is received from R1$a$ and R1$b$ and a "low level" from R1$c$, a high level is applied at the output of M1. In the normal situation, i.e. in the absence of a fault, the same control signals are applied to the inputs which are then output by the majority voter M1 at its output. A nonconformity of an input signal, for example of replicant R1$c$, can additionally give rise to an error message. Nonconforming inputs of a majority voter can furthermore reliably be blocked. The output signals of the majority voters M1, M2 are thus control signals which have already been redundantly secured, i.e. voted control signals, which are trustworthy. Depending on the number of replicants R1$a$, R1$b$, R1$c$, R2$a$, R2$b$, R2$c$, it is also possible to use more than two majority voters M1, M2 or to provide more inputs per majority voter M1, M2. In the case of five inputs, the majority voters M1, M2 can by way of example already tolerate two nonconforming control signals.

According to the invention, the outputs of the plurality of majority voters M1, M2 are connected to the inputs of a discriminator voter D, the output signal of which is the control signal for controlling signal towers. Only if the inputs of the discriminator voter D are at variance does the discriminator voter D generate no output signal. Nonconformity of an upstream majority voter M1, M2 can advantageously be identified as a consequence. Since, in the preliminary stage, the majority voters M1, M2 already send control signals which have been voted by a majority decision to the discriminator voter D, an additional safety level is thus introduced which reduces the probability of erroneous signal transmission. A discriminator voter D furthermore has less complex and thus more failure-resistant hardware than a majority voter M1, M2, such that the probability of failure of the inventive system S is reduced.

The plurality of replicants R1$a$, R1$b$, R1$c$, R2$a$, R2$b$, R2$c$ and the voter structure 1 are separated from one another in hardware terms, whereby the tasks they perform are separated from one another. Voter structure 1 and replicants R1$a$, R1$b$, R1$c$, R2$a$, R2$b$, R2$c$ then advantageously form different failure units. As a consequence, it is advantageously possible to locate the source of a failure in targeted manner. In addition, it is no longer necessary to make use of special hardware with integrated voter units, it instead being possible to use conventional commercial computing hardware.

If only one input signal is present at the discriminator voter D, the discriminator voter D then acts as a through-connector, i.e. it can nevertheless generate a control signal as output signal, specifically the signal applied thereto. This system can therefore tolerate failure of a majority voter M1, M2, so making the majority voter M1, M2 no longer a critical component of the system S.

In a higher safety level, the entire system S can be blocked if the discriminator voter D does not receive an input signal from a majority voter M1, M2 or if the inputs of the discriminator voter D are at variance with one another.

DESCRIPTION OF THE INVENTION

The downstream discriminator voter D can form a self-contained configurable device. The downstream discriminator voter D can, however, also be integrated within an evaluation unit and so form a failure unit with the evaluation unit.

The number of replicants R1$a$, R1$b$, R1$c$, R2$a$, R2$b$, R2$c$ and the number of majority voters M1, M2 is here selected only by way of example, the invention however not being limited thereto. For example, more replicants R1$a$, R1$b$, R1$c$, R2$a$, R2$b$, R2$c$ and/or more majority voters M1, M2 can be used.

In FIGS. 2-4, only the differences relative to FIG. 1 or relative to one another are addressed.

FIG. 2 describes a system S for controlling signal towers according to a second embodiment. In contrast with FIG. 1, two discriminator voters D1, D2 are provided, the inputs of each discriminator voter D1, D2 being connected to both outputs of the majority voters M1, M2. Redundancy of the discriminator voters D1, D2 is consequently created. Should one discriminator voter, for example D1, fail, the voted control signal can then still be obtained at the output of D2. This arrangement furthermore permits a local separation of the discriminator voters D1, D2, for example if two voted signals are to be provided at different locations. More than two discriminator voters D1, D2 can also be provided.

The number of replicants R1$a$, R1$b$, R1$c$, R2$a$, R2$b$, R2$c$, the number of majority voters M1, M2 and the number of discriminator voters D1, D2 is here too selected only by way of example, the invention however not being limited thereto. For example, more replicants R1$a$, R1$b$, R1$c$, R2$a$, R2$b$, R2c, more majority voters M1, M2 and/or more discriminator voters D1, D2 can be used.

FIG. 3 describes a system for controlling signal towers according to a third embodiment. These are frequently distributed systems. In comparison with FIGS. 1 and 2, two replicants R1a, R1b, R1c or R2a, R2b, R2c which are locally or spatially separated from one another are described by way of example. A plurality of replicants R1a, R1b, R1c are situated at a location L1 and a further plurality of replicants R2a, R2b, R2c are situated at a further location L2, location L2 being spatially separated from location L1. The downstream majority voters M1, M2 can, but need not, be locally separated from one another. In the specific embodiment, one majority voter M1 is situated at location L1 and one majority voter M2 at location L2. The discriminator voter is preferably situated at location L3, which differs from location L1 and location L2. Should, due to particular events such as supply failures, natural disasters etc., one "location", for example location L1, then fail, a voted control signal can still be output via the discriminator voter D by the other location L2 via replicants R2a, R2b, R2c using majority voter M2. In this manner, geographic or local redundancy is thus created with fail-safe responsibility for spatially distributed systems. Failure of a discriminator voter or associated connections furthermore advantageously has a reduced impact on the transmitter-side system since they are located on the failure unit of the receiver or consumer.

The number of replicants R1a, R1b, R1c, R2a, R2b, R2c, the number of majority voters M1, M2 and the number of locations L1, L2 is here too selected only by way of example, the invention however not being limited thereto. For example, more replicants R1a, R1b, R1c, R2a, R2b, R2c and/or more majority voters M1, M2 can be used. In addition, a plurality of locations L1, L2 with corresponding replicants R1a, R1b, R1c, R2a, R2b, R2c per location L1, L2 can be described in order to create still greater geographic or local redundancy.

FIG. 4 describes a further system S for controlling signal towers according to a fourth embodiment. In contrast with FIG. 3, two discriminator voters D1, D2 are provided, the inputs of each discriminator voter D1, D2 being connected to both outputs of the majority voters M1, M2. Redundancy of the discriminator voters D1, D2 is consequently created. Should one discriminator voter, for example D1, fail, the voted control signal can then still be obtained at the output of D2. In this exemplary embodiment, the discriminator voters D1, D2 are situated at different locations L3, L4. Discriminator voter D1 is located by way of example at location L3 while discriminator voter D2 is located by way of example at location L4. In this manner, local failure at one of locations L3 or L4 can be tolerated thanks to the local separation of discriminator voters D1, D2. In this manner, geographic or local redundancy can be created with fail-safe responsibility for spatially distributed systems. In this case too, it is possible to provide more than two discriminator voters D1, D2 which are situated for example at more than two locations L3, L4 which differ from one another.

The number of replicants R1a, R1b, R1c, R2a, R2b, R2c, the number of majority voters M1, M2, the number of locations L1, L2 or L3, L4 and the number of discriminator voters D1, D2 is here too selected only by way of example, the invention however not being limited thereto. For example, more replicants R1a, R1b, R1c, R2a, R2b, R2c, more majority voters M1, M2 and/or more discriminator voters D1, D2 can be used.

In brief, a system S for controlling signal towers is described which, by means of a downstream discriminator voter D, D1, D2, outputs control signals which have already been voted by majority voters M1, M2. The discriminator voter D, D1, D2 only outputs a control signal if the inputs thereof are not at variance with one another. A plurality of discriminator voters D1, D2 can also be arranged downstream. In addition, nonconforming majority voters M1, M2 can be blocked. The invention reduces failure risk and thus increases availability of the system S. In addition, geographic or spatial redundancy can be achieved for locally distributed systems, such that local failure of the system S can be tolerated. The majority of replicants R1a, R1b, R1c, R2a, R2b, R2c and the voter structure 1 are separated from one another in hardware terms, whereby the tasks they perform are separated from one another. Voter structure 1 and the majority of replicants R1a, R1b, R1c, R2a, R2b, R2c then advantageously form different failure units. As a consequence, it is advantageously possible to locate the source of a failure in more targeted manner. In addition, it is no longer necessary to make use of special hardware with integrated voter units, it instead being possible to use conventional commercial computing hardware.

Although the invention has been illustrated and described in greater detail with reference to preferred exemplary embodiments, the invention is not limited by the disclosed examples and other variations may be derived therefrom by a person skilled in the art without going beyond the scope of protection of the invention.

The invention claimed is:

1. A system, comprising:
a plurality of redundant replicants for generating redundant control signals, said plurality of redundant replicants having outputs;
a voter structure for outputting control signals, said voter structure including a plurality of majority voters, each of said plurality of majority voters having a respective output generating an output signal based on a majority decision and having inputs connected to said outputs of said plurality of redundant replicants;
said voter structure and said plurality of redundant replicants being separated from one another in hardware terms; and
a discriminator voter having inputs connected to said outputs of said plurality of majority voters, and said discriminator voter having an output for providing a control signal only if signals at said inputs of said discriminator voter are not at variance with one another.

2. The system according to claim 1, wherein said signal at said output of said discriminator voter is configured to control signal towers in rail traffic.

3. The system according to claim 1, wherein said discriminator voter is configured to act as a through-connector if only one input signal is applied to said inputs of said discriminator voter.

4. The system according to claim 1, wherein the system is configured to output an error message if said discriminator voter does not receive an input signal from one of said plurality of majority voters.

5. The system according to claim 1, wherein the system is configured to entirely block if said discriminator voter does not receive an input signal from one of said plurality of majority voters or if said inputs of said discriminator voter are at variance with one another.

6. The system according to claim 1, wherein:
said discriminator voter is one of a plurality of downstream discriminator voters each having inputs;

said outputs of said plurality of majority voters are connected to each of said inputs of each of said discriminator voters; and each of said discriminator voters has an output providing a control signal.

7. The system according to claim 6, wherein said signals at said outputs of said discriminator voters are configured to control signal towers in rail traffic.

8. The system according to claim 6, wherein said plurality of downstream discriminator voters form a self-contained configurable device.

9. The system according to claim 6, wherein said plurality of downstream discriminator voters are integrated within an evaluation unit.

10. The system according to claim 1, which further comprises a plurality of spatially separated locations each including at least one of:

a plurality of replicants, or a majority voter, or a discriminator voter.

11. The system according to claim 1, wherein the system is configured to output an error message if not all input signals at one of said majority voters are identical.

12. The system according to claim 1, wherein said discriminator voter forms a self-contained configurable device.

13. The system according to claim 1, wherein said discriminator voter is integrated within an evaluation unit.

\* \* \* \* \*